United States Patent [19]

Chukhanov et al.

[11] 4,165,696

[45] Aug. 28, 1979

[54] ARRANGEMENT FOR PIPELINE TRANSPORTATION OF CARGOES

[75] Inventors: Zinovy F. Chukhanov; Sergei A. Tsuprov; Danil M. Apter, all of Moscow, U.S.S.R.

[73] Assignee: Gosudarstvenny Nauchnoissledovatelsky Energetichesky Institut Imeni G.M. Krzhizhanovskogo, Moscow, U.S.S.R.

[21] Appl. No.: 855,565

[22] Filed: Nov. 29, 1977

[51] Int. Cl.² .......................................... B61B 13/10
[52] U.S. Cl. ................................ 104/147 R; 104/165; 104/172 B; 198/811
[58] Field of Search ..................... 302/1, 2 R, 11, 12, 302/14; 104/23 FS, 71, 134, 138 R, 147 R, 154, 155, 165, 168, 172 R, 172 B, 172 C; 105/365; 198/811

[56] References Cited

U.S. PATENT DOCUMENTS

| | | | |
|---|---|---|---|
| 780,348 | 1/1905 | Jackman | 104/172 B |
| 3,590,745 | 7/1971 | Ouska | 104/172 B |
| 3,768,624 | 10/1973 | Kornylak | 104/165 X |
| 3,799,327 | 3/1974 | Schulz | 104/172 B X |
| 3,831,794 | 8/1974 | Bohman | 104/172 B X |
| 3,848,536 | 11/1974 | Chukhanov et al. | 104/138 R X |

Primary Examiner—Robert B. Reeves
Assistant Examiner—James L. Rowland
Attorney, Agent, or Firm—Fleit & Jacobson

[57] ABSTRACT

An arrangement comprises a pipeline filled with liquid at atmospheric pressure. The pipeline serves for displacement of containers with cargo therein by means of driven conveyors arranged along the pipeline. Endless traction members of the conveyors comprise belts having at least one row of equally spaced elements. Each container has at least one longitudinal groove with stops for engagement with the belt elements during the displacement of the containers. The arrangement according to the invention enables transportation of cargoes with comparatively low power consumption.

12 Claims, 12 Drawing Figures

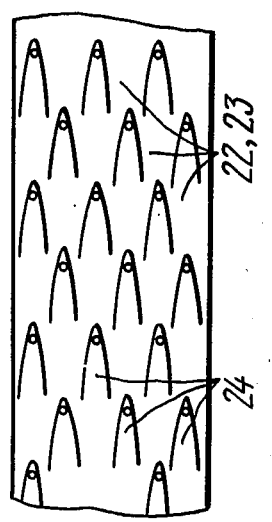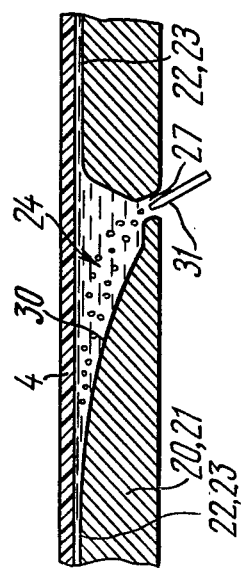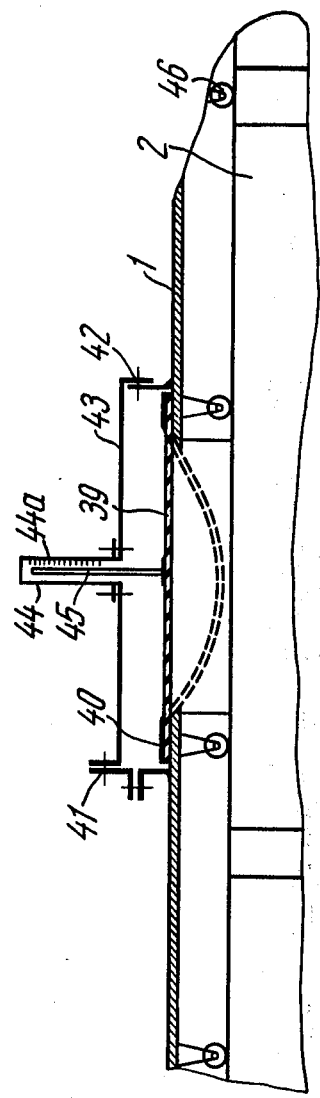

ARRANGEMENT FOR PIPELINE TRANSPORTATION OF CARGOES

The invention relates to the transportation systems, and more specifically to arrangements for pipeline transportation of cargoes.

The arrangement according to the invention may be most efficiently used for handling heavy freight traffic of coal, ore, construction materials and the like at long distances.

The invention may be used for long-range transportation of containers with liquid and piece cargoes, as well as for medium-range transportation of such cargoes at distances of some hundred kilometers.

Known in the art is an arrangement for free flow pipeline transportation of containers with cargo comprising a mainline filled with liquid at substantially atmospheric pressure, and a substantially endless container train moving in the mainline under the action of conveyors having endless traction members which are mounted in the mainline in a sequence, the containers of the train engaging each of the endless conveyors during the displacement along the pipeline.

The arrangement for free flow pipeline transportation of cargoes provides for an inexpensive transportation of mass cargoes of any kind with sufficiently high throughput capacity. This arrangement does not cause any alterations of transported goods, it does not require thick-walled steel pipes and return loop of the pipeline. Such arrangement also ensures high throughput capacity and requires low capital investments for the construction.

However, the prior art arrangement for free flow pipeline transportation of cargoes has the following disadvantages which are due to its structural features.

The endless traction member of the conveyors comprises a steel or plastic rope having local enlargements equally spaced therealong.

The containers are provided with members engaging the rope which are mounted on the outer surface of each container to occupy a large part of the annular space between the containers and the inner surface of the pipeline filled with liquid. Making the rope with local enlargements is very difficult since the industrial manufacture of such ropes represents a serious problem. A plastic rope has a low strength and exhibits large elongation, while a metal rope is prone to corrosion in the surrounding liquid which is water.

The members projecting from the containers to engage the rope increase hydrodynamic drag so that power consumption for transportation of payload increases.

It is an object of the invention to provide an arrangement for pipeline transportation of cargoes in which the endless traction members of the conveyors and the containers are so constructed as to reduce the power consumption for transportation of cargoes.

Another not least important object of the invention is to provide an arrangement for pipeline transportation of cargoes in which the endless traction members of the conveyors and the containers are so constructed as to ensure an improved reliability of the arrangement.

Further object of the invention is to provide an arrangement for pipeline transportation of cargoes which is simple and inexpensive in the manufacture.

These objects are accomplished by that in an arrangement for pipeline transportation of cargoes comprising a pipeline filled with liquid at substantially atmospheric pressure which serves for displacing therein containers by means of conveyors arranged in a sequence along the entire length of the pipeline and having endless traction members which engage the containers during their displacement, according to the invention, the endless traction member of each conveyor comprises a belt guided by means of supports and having at least one row of elements and each container has at least one longitudinal groove having stops for engaging the elements during the displacement of the containers.

With such a construction of the arrangement, the hydraulic resistance during the movement of the containers is substantially lowered thus resulting in reduction of power consumption for transportation of cargoes.

The traction member comprising a belt having elements exhibits high strength and reduced elongation during operation compared to the rope used in the prior art arrangement.

The above-described construction of the endless traction members and containers is sufficiently compact, simple in the manufacture and reliable in operation.

The adjacent elements of each row of the belt are preferably spaced from each other at a distance equal to at least one third of the length of each container.

This facility provides for reliable engagement of the belt with a respective container with any relative position of each conveyor and incoming containers.

The belt of each container preferably has a drive run which is curved in accordance with the shape of the bottom wall of the containers and comprises two rows of said elements extending along the edges of the belt, the elements of both rows being mounted in an inclined position relative to one another, respectively, and each container has two longitudinal grooves with stops for engaging the elements of the belt during the displacement of the containers.

This construction improves the stability of the containers in the pipeline and enables the reduction in the number of centering rollers which are normally provided on the inner surface of the pipeline.

The stops of the longitudinal groove of each container preferably comprise transverse partition members equally spaced along the entire length of the groove.

This largely facilitates the engagement of the elements with the containers at the initial portion of each conveyor and disengagement of said elements from the grooves at the end of the conveyor, while the probability of the belt elements to engage with one of the stops of the longitudinal groove of the container is increased.

Each element of the belt is preferably provided, at the distal end thereof, with a roller having its axis extending substantially at right angle to the longitudinal axis of the belt.

The provision of the roller contributes to smooth engagement and disengagement of the belt element from each stop of the longitudinal groove of the container.

The stops of the longitudinal groove of each container preferably comprise wedge-shaped projections arranged in a sequence on the side walls of each groove along the entire length thereof, and the elements of the belt have wedge-shaped bosses at the distal ends thereof engaging the wedge-shaped projections of the groove.

This construction of the groove stops and belt elements provides for a stronger engagement of the belt with the containers in the vertical plane thus eliminating the slack of the belt between the supports thereof and reducing friction with the supports. Tensile and bending stresses of the belt are thus reduced, and the power consumption for transportation of the containers is lowered.

The supports of the belts preferably comprise troughs having, in their surfaces facing the belts, recesses of a wedge-shaped cross-section which are oriented with their narrow portion in the direction of movement of the belt, the large portion of each recess having a passage for admission of liquid filling the pipeline to the surface of the belt facing the troughs.

This construction of the belt supports enables the belt to slide over the supports with liquid friction, that is with minimum energy expenses, and eliminates bending of the belt at the supports which is the main cause of fatigue destruction of the belt in the conveyors using roller supports.

Each transverse partition member of the longitudinal groove is preferably provided with an elastic device bearing against the distal end of the respective element of the belt.

This device provides a shock-absorbing facility for engagement of the belt elements with the transverse members; besides, the influence of the error of spacing of the belt elements due to both manufacturing tolerances and non-uniform elongation of the belt during the displacement of the containers is eliminated.

The recesses of each trough are preferably equally spaced in a staggered pattern over the support surface thereof.

This facility enables the liquid friction conditions to be provided over the entire support surface of each trough with minimum number of recesses.

Each passage of the large portion of each recess preferably incorporates a nozzle communicating with an air source for feeding air to the support surface of the belt so that an air-water emulsion is formed to reduce friction during the movement of the belt.

This facility provides for further reduction of friction, hence lowering of power consumption for sliding of the belt over the trough by enlarging the liquid layer between the belt and the trough.

Each trough is preferably of a length which is equal to 0.2–0.5 of the length of the container, the troughs being spaced from one another at a distance of 2–5 length of the container.

This construction of the troughs results in considerable reduction of their manufacturing and installation cost without shortening the service life of the belt. This advantage is especially remarkable with neutral-buoyancy of the containers and belts.

The arrangement for pipeline transportation of cargoes according to the invention enables the transportation with lower power consumption and exhibits an improved reliability. The construction of the arrangement according to the invention is rather simple and inexpensive in manufacture.

The invention will now be described with reference to a specific embodiment thereof illustrated in the accompanying drawings, in which:

FIG. 1 diagrammatically shows a portion of the arrangement according to the invention;

FIG. 9 is a view similar to that of FIG. 8, but with a different shape of the trough surface;

FIG. 10 is a diagrammatic view taken along the arrow C in FIG. 7 (the belt is not shown);

Figure 1:
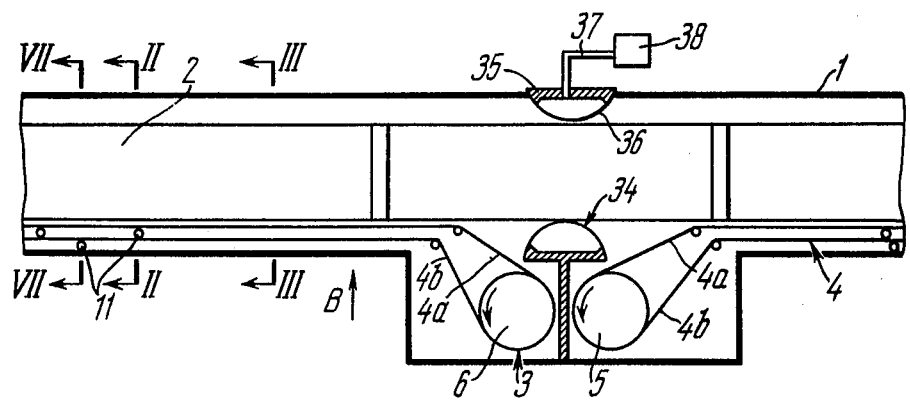

FIG. 12 diagrammatically shows the arrangement according to the invention with a local constriction of the pipeline formed by a flexible cylinder.

The arrangement for pipeline transportation of cargoes according to the invention comprises a pipeline 1 (FIG. 1) composed of reinforced concrete pipes. In certain cases the pipeline may be formed of ceramic, plastic or metal and other pipes.

The pipeline is laid directly on the ground, and in the areas where low-temperature periods are observed for rather long time, the portions of the pipeline situated in such areas are submerged in the non-freezing bed of soil.

The pipeline 1 accommodates containers 2 which are interconnected to form trains consisting of 30–100 containers.

The containers 2 carry a payload, preferably, lump fuel, ore or bulk construction materials and the like. It is also advantageous to transport in containers oil, liquified gas and piece loads if in a mass quantity. The containers 2 comprise light-weight airtight metal structures, but they may also be made of plastic and any other appropriate material.

Water fills the annular space between the containers 2 and the pipeline 1 to balance the gravity forces acting on the containers (water is not shown in the drawings). Other liquids may also be used, such as liquid resins, oil, kerosene, gasoil and any other freeze resistant compositions.

Water filling the annular space is at different levels at various portions, the level being equal to or lower than the pipeline diameter, the level and eventual gauge pressure being kept constant at each portion of the pipeline. For that purpose, the pipeline is provided with devices for automatic discharge of water from or pumping it to the pipeline at these portions of the line where it changes the grade. These devices are not shown in the drawings, and they may be of any appropriate type not described herein so as not to hamper the description of the invention.

In order to cause the movement of the containers 2, there are provided conveyors 3 having endless traction members 4 in the form of flexible belts indicated by the same reference numeral 4 which are mounted in a sequence along the entire length of the pipeline 1.

The belt 4 is made of a material on a textile support having a plasticized polyvinyl chloride coating and reinforced with steel wire. The belt 4 may also be made of any other material suitable for the purpose which is resistant to the liquid filling the pipeline and is strong enough. The use of such belt as traction member of the conveyor to replace ropes of the prior art arrangements facilitates the design and manufacture of the arrangement according to the invention for various kinds of cargoes, freight traffic volumes and transportation ranges, taking into account the availability of a large range of such belts. In addition, various engaging elements may be readily provided on the belt by a simple and reliable manner known in the industrial manufacture.

Each flexible belt 4 has a drive run 4a and a driven run 4b.

Each conveyor 3 has a drive station 5 for driving the belt 4 which is provided at one end of the conveyor 3 and a tensioning station 6 for tensioning the belt provided at the opposite end of the conveyor 3.

Figure 2:
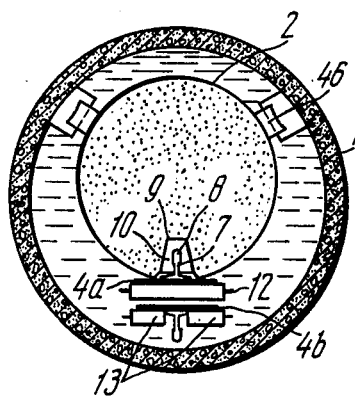
FIG. 2 is an enlarged sectional view taken along the line II—II in FIG. 1, with the belt having one row of elements provided along the entire length thereof.

Each flexible belt 4 has one row of elements 7 equally spaced therealong (FIG. 2) which are adapted to engage the containers 2 to transmit a traction force thereto. The elements 7 of the belt 4 comprise rods indicated by the same reference numeral 7 attached to the belt 4 by any appropriate known method and having enlarged distal ends 8.

Each container 2 has a longitudinal groove 9 provided with stops 10 cooperating with the elements 7.

This engagement of the belt 4 with the containers 2 enables the elements 7 to be received within the containers 2 thereby making the outer surface of the containers free of any projecting elements which, on the one hand, lowers the hydrodynamic drag of the containers 2 during their movement in the pipeline 1, and on the other hand, results in reduced amount of water entrained by the containers 2.

Each flexible belt 4 is guided and supported by supports 11 (FIG. 1) which are equally spaced along the pipeline 1.

Each support 11 comprises a roller 12 (FIG. 2) supporting the drive run 4a of the belt 4, and rollers 13 supporting the driven run 4b and spaced from one another transversely of the belt at a distance enabling free movement of the elements 7 therebetween during the movement of the containers 2.

The distance between the adjacent elements 7 of the belt 4 is slightly smaller than one third of the length of each container 2 thereby providing for reliable engagement of at least two elements 7 with each container 2 at any relative position of the elements 7 and the containers 2 during the engagement.

Figure 3:
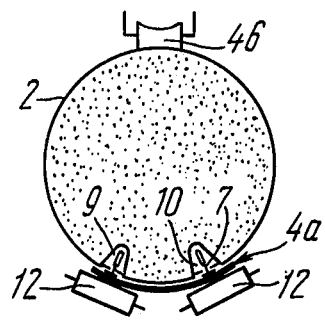
FIG. 3 is an enlarged sectional view taken along the line III—III in FIG. 1, with the belt having two rows of elements; the driven run of the belt with the supports thereof and the pipeline are not shown.

In certain applications of the invention, the drive run 4a of each conveyor 3 is curved in accordance with the shape of the bottom wall of the container 2 as shown in FIG. 3. In such case, the belt 4 has two rows of the elements 7 arranged along the edges of the belt 4. The elements 7 of one row are in an inclined position to the elements 7 of the other row, respectively.

To produce the arcuate shape of the drive run 4a of the belt 4, it is supported by two rows of inclined support rollers 12, and each container 2 has two longitudinal grooves 9 with stops 10 for engagement with the elements 7 of the belt 4 during the movement of the containers 2. In this case, the driven run 4b of the belt 4 is flat and supported by a single row of the support rollers 13 arranged inbetween the elements 7 (not shown). This construction of the drive run 4a of the flexible belt 4 and supports 11 of the conveyor improves the stability of the containers 2 in the pipeline 1.

Figure 4:
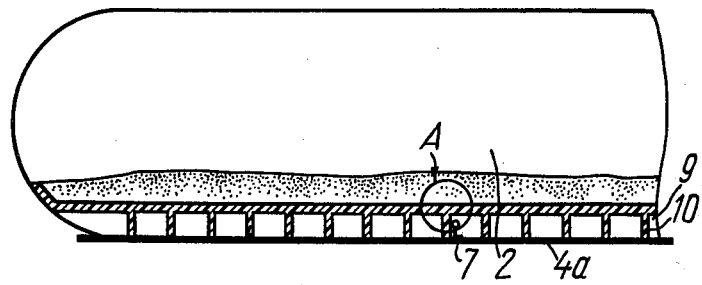
FIG. 4 is an enlarged view of the container with the stops of the longitudinal groove comprising transverse partition members.

In some applications of the invention, the stops 10 of the longitudinal groove 9 of each container 2 comprise transverse partition members which are equally spaced along the entire groove 9 as shown in FIG. 4. This construction of the stops 10 largely facilitates the engagement of the elements 7 with the containers 2 and provides for free disengagement of the flexible belt 4 from the containers 2 at the end of each conveyor 3. The provision of a plurality of the partition members in a single groove increases the probability of the elements 7 of the belt 4 to engage the stops 10 of the longitudinal groove 9.

Figure 5:
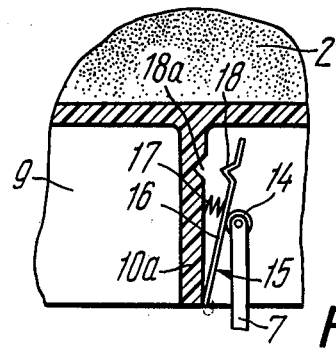
FIG. 5 is an enlarged illustration of detail A in FIG. 4, with each belt element having, at the distal end thereof, a roller, and with each transverse member of the longitudinal groove having an elastic device.

In the arrangement according to the invention, each element 7 of the belt 4 has, at the distal end thereof, a roller 14 (FIG. 5) having its axis substantially at right angle to the longitudinal axis of the belt 4.

According to the invention, each transverse partition member 10a of the longitudinal groove 9 of the container 2 has an elastic device 15 comprising a plate 16 articulated to the partition member 10a with one end thereof and bearing with the other end against the distal end of a respective element 7 of the belt 4. The device 15 also comprises a spring 17 bearing against the plate 16.

The plate 16 is bent at 18 in the zone adjacent to the distal end thereof to receive the roller 14 by the end of engagement of the belt 4 with the container 2. This facility reduces the relative displacement of the belt 4 and the container 2. The provision of the elastic device 15 not only provides the shock-absorbing action upon engagement of the elements 7 with the partition members 10a, but it also contributes to a greater number of the elements 7 to be engaged with the partition members 10a of the groove 9 since the spring 17 compensates for non-uniformity of spacing of the partition members 10a and elements 7 (both manufacturing tolerances and errors in spacing induced by elongation of the belt 4 are involved).

Figure 6:
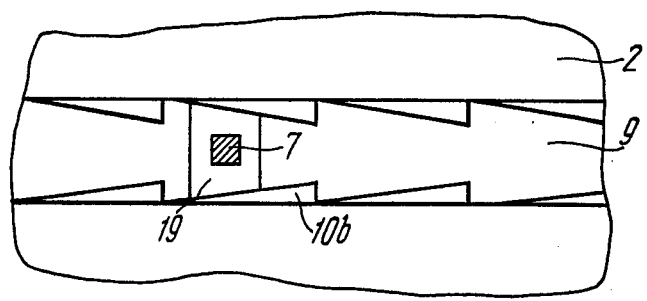
FIG. 6 is an enlarged view taken along the arrow B in FIG. 1 (the pipeline is not shown) with the stops of the longitudinal groove comprising wedge-shaped projections.

In accordance with further embodiment of the invention, the stops 10 of the longitudinal groove 9 of each container 2 comprise wedge-shaped projections 10b (FIG. 6) arranged in a sequence on the side walls of each groove 9 along the entire length thereof. The elements 7 of the belt 4 are respectively provided with wedge-shaped bosses 19 at the distal ends thereof which engage the wedge-shaped projections 10b of the groove 9.

This construction of the elements 7 and stops 10 of the containers 2 prevents the belt 4 from sagging between the supports 11 (FIG. 1) thus reducing the stresses therein and prolonging its service life. In addition, the spacing of the supports 11 may be increased.

Figure 7:
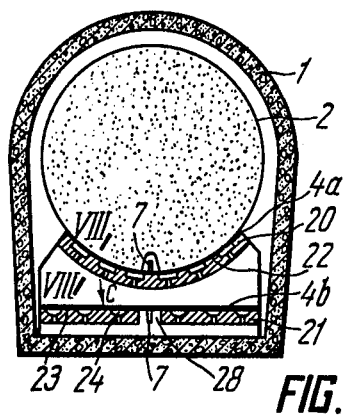
FIG. 7 is an enlarged sectional view taken along the line VII—VII in FIG. 1, with the belt supports comprising troughs having recesses.

In some applications, the supports 11 of the belts 4 are made in the form of troughs 20,21 (FIG. 7).

During the movement of the belt over the roller supports, alternating bending of the belt occurs, and the containers may hit against the rollers. This considerably shortens the service life of the belt.

The use of smooth troughs as supports for the belt permits these disadvantages to be eliminated.

Figure 8:
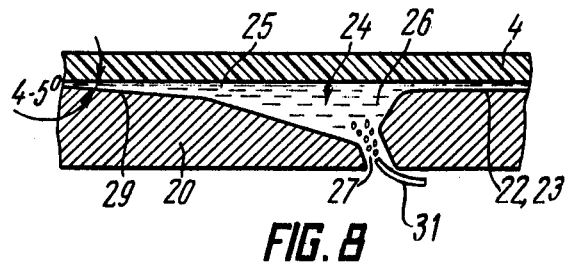
FIG. 8 is an enlarged sectional view taken along the line VIII—VIII in FIG. 7.

The support surfaces 22,23 of the troughs 20,21 facing the belt 4 have recesses 24 which are shaped as wedges in the cross-section as shown in FIG. 8 for the trough 20. The recesses are oriented to extend with the narrow portion 25 thereof in the direction of movement of the belt 4. The large portion 26 of each recess 24 has a passage 27 for admission of water filling the pipeline to the surfaces of the belt 4 facing the troughs 20,21. The trough 20 of the drive run 4a of the belt 4 is curved in accordance with the shape of the bottom wall of the containers 2, and the trough 21 of the driven run 4b of the belt 4 is flat and has a longitudinal groove 28 (FIG. 7) for free passage of the elements 7.

The troughs 20,21 are made of thin metal sheet, but they may also be made of plastic and other materials which are resistant to corrosion in water filling the pipeline 1 and exhibit good antifriction properties in respect of the material of the belt 4. The recesses 24 and the passage 27 may be formed by any appropriate known method, including pressing.

In order that a pressure sufficient to lift the belt 4 thereby ensuring liquid friction of the belt 4 over the troughs 20,21 might be provided in the narrow portion 25 of the recesses 24, the bottom wall 29 (FIG. 8) of the recess 24 is inclined with respect to the support surfaces 22,23 of the troughs 20,21 at an angle of from 4° to 5°.

In certain applications, the bottom wall 29 of the recess 24 is preferably made with a convex surface 30 cambered upwards (FIG. 9 which smoothly mates with the corresponding support surfaces 22,23 of the troughs 20,21.

In order to lower the friction of the belt 4 over the support surfaces 22,23 of the troughs 20,21, the passage 27 incorporates an air nozzle 31 (FIGS. 8,9) communicating with an air source (not shown). With low speed of the belt movement, the nozzles 31 are supplied with compressed air which is admitted to the gap between the belt 4 and the respective support surfaces 22,23 and together with water forms an air-water emulsion. With sufficiently high speeds of movement of the belt 4, when a great quantity of water is taken up by the belt 4 from the recesses 24, reduced pressure develops in the passages 27 to ensure the air intake from the nozzles 31 without using any air source.

The wedge-shaped recesses 24 are equally spaced in a staggered pattern over the support surfaces 22,23 of the troughs 20,21 as shown in FIG. 10 for the surface 22. With the shape of the recesses 24 being approximately triangular in a plan view with the divergence in the direction of movement of the belt 4, the liquid friction of the belt 4 over the entire support surfaces 22,23 of the troughs 20,21 is ensured with minimum number of the recesses 24.

Figure 11:
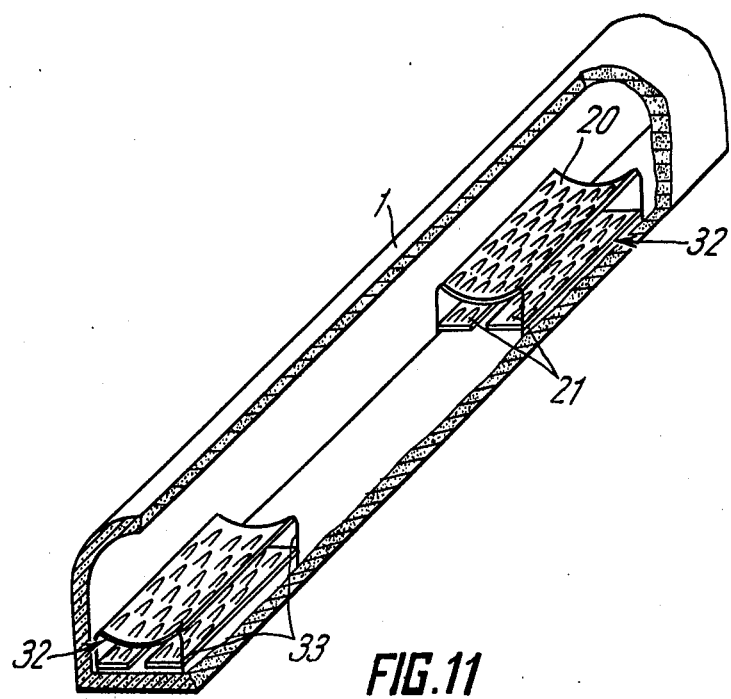
FIG. 11 is a diagrammatic perspective view of the pipeline having belt support comprising troughs forming individual blocks.

In cases, or in those portions of the pipeline 1, where the traction force of the belt 4 is at the maximum so that the sag in the vertical plane is small, the troughs 20,21 are discontinued, that is they are provided in the form of individual blocks 32 (FIG. 11) spaced from one another. The individual blocks 32 consist of the upper trough 20 supporting the drive run 4a of the belt 4, the lower trough 21 supporting the driven run 4b of the belt 4 and uprights 33 connecting the troughs 20 and 21 into individual blocks 32. In a commercial pipeline with the containers of 1200 mm in diameter, the length of each trough 20,21 is equal to 0.3 of the length of one container 2 and may be of from 0.2 to 0.5 of the length thereof.

The spacing of the blocks 32 is equal to three lengths of one container 2 and may be from two to five lengths of the container.

Individual blocks 32 may be spaced from one another at different distances and in certain applications may also form a continuous block.

To control the amount of water entrained by the containers 2, there are provided, within the pipeline 1, local constrictions 34 shown in FIG. 1 which are spaced from one another at a pre-set distance.

The local constrictions 34 are provided between the adjacent conveyors 3 and each comprise a toroidal member 35 having the inner space defined by a resilient flexible wall 36 which communicates, via a pipe 37, with a variable-pressure water supply source 38 which in this case is a pump indicated at the same reference numeral 38. Other fluid, such as air may be used to replace water.

FIG. 12 shows an embodiment of the local construction of the pipeline 1 defined by the periphery of a flexible cylinder 39 fitted on the ends of portions of the pipeline 1 and secured thereto by means of collars 40.

Flanges 41 and 42 welded to the pipes 1 support a removable casing 43 having a transparent measuring tube 44 provided with a scale 44a. The tube 44 accommodates a rod 45 mounted in a spaced relation thereto and secured to the flexible cylinder 39. The position of the free end of the rod 45 relative to the scale 44a is used to evaluate the passing area of the pipeline 1 which varies upon pumping of various amounts of fluid to the inner space of the casing 43.

Such local constrictions 34 communicating with a variable-pressure fluid source are used to control water velocity in the pipeline 1 during the movement of the containers 2.

The above-described arrangement for pipeline transportation of cargoes according to the invention functions in the following manner.

The containers 2 are filled with fuel at loading stations (not shown) at the beginning of the pipeline 1 to the weight ensuring them to have neutral buoyancy in water filling the pipeline 1. The containers 2 are sealed in such a manner as to make them airtight and are then interconnected into trains and fed to the pipeline 1, to the first conveyor 3. The elements 7 of the belts 4 are thus received in the longitudinal groove 9 of each container 2 and co-operate with the stops 10 to transmit the traction force to the containers 2. It is noted that at least two elements 7 are engaged with each container 2.

At the end of each conveyor 3, the belt 4 thereof changes its direction before the tensioning station 6 so that the elements 7 of the conveyor freely leave the longitudinal grooves 9 of the containers 2. The driven run 4b of the belt 4 guided by the roller supports 11 is returned back in the direction opposite to that of the movement of the containers 2 to the tensioning station 6.

The containers 2 are transferred to the next conveyor 3 by approaching first its drive station 5 from which the belt 4 moves upwards to the containers 2 passing thereby at a speed equal to that of the belt 4.

The elements 7 are received in the grooves 9 of each container 2 to engage the stops 10 and push the containers 2 forward to the next conveyor 3.

At the end of the travel, the containers 2 are unloaded by using conventional devices (not shown) and may be returned back along a return loop of the pipeline 1 in the same manner. However, for heavy freight traffic, beginning with 20-25 mln. tons per year, and with long distances of travel, beginning with 500-600 km, transportation without the return of containers becomes more expedient. In such case, the containers 2 are delivered from the pipeline and burnt by the user together with fuel contained therein.

During the movement of the containers 2 in the pipeline 1, water in the annular space between the containers 2 and the pipeline 1 is entrained in a progressive motion, the water level which is about equal to the diameter of the pipeline 1 at inclined portions of the line being kept constant by using discharge or refilling facilities at those points of the line at which the grade is changed, and the velocity of water in the pipeline 1 is controlled by means of the local constrictions 34.

The pumps 38 feed water to the inner space 35 along the pipes 37, and the flexible wall yields to change the amount of annular space between the containers 2 and the wall 36.

In case the local constriction is constructed as shown in FIG. 12, to reduce water flow rate in the pipeline 1, water is fed to the inner space of the casing 43 to cause bending of the periphery of the flexible cylinder 39 towards the outer surface of the containers 2. The rod 45 secured to the flexible cylinder 39 indicates, on the scale 44a of the transparent measuring tube 44, those parameters of the local constriction 34 for which the scale 44a is graduated, e.g. the amount of space between the periphery of the cylinder 39 and the containers 2 or water flow rate at the local constriction 34.

In case the traction member comprises a flat belt 4 having a single row of the elements 7, the drive run 4a of the belt 4 moves over a single row of the support rollers 12, and the elements 7 of the belt 4 engage the stops 10 of the single longitudinal groove 9 of each container 2. The containers 2 are stabilized in the pipeline 1 by means of the centering rollers 46 (FIGS. 2,3) mounted in the pipeline 1. It is noted that, owing to the neutral buoyancy of the containers 2 and the belt 4 connected thereto, no vertical forces are transmitted to the support rollers 12 which materially prolongs their service life and improves the reliability in operation.

In case the traction member comprises a belt having two rows of the elements 7, the drive run 4a of the belt 4 moves over two rows of the support rollers 12, and the elements 7 thereof co-operate with two rows of the stops 10 in two grooves 9 of each container 2. The engagement of each row of the elements 7 with the stops 10 of each row of the longitudinal grooves 9 of the containers 2 occurs in the same manner as described above. Since in this case the containers 2 move in a more stable manner due to the provision of two rows of the support rollers 12, only one row of the centering rollers 46 rolling over the outer surfaces of the containers 2 can prevent the containers 2 from floating upwards.

The elements 7 of the belt 4 transmit the traction force, during the engagement of the belt 4 with the containers 2, to the stops 10 comprising transverse partition members 10a or wedge-shaped projections 10b. In the former case they slide during the engagement over the transverse partition members 10a having the bent portion 18a to receive the roller 14. The bent portion 18 provides for reduction of oscillations of the belt 4 relative to the containers 2 during their transportation between the tensioning station 6 and the drive station 5 of each conveyor 3.

In order to ensure an impactless engagement of the elements 7 with the transverse partition members 10a, the latter are provided with elastic devices 15. In such case, during the engagement of the containers 2 with the belt 4, the rollers 14 of the elements 7 roll over the support plates 16 until they are received in the bent portion 18.

In another embodiment, where the stops 10 comprise wedge-shaped projections 10b, the wedge-shaped bosses 19 of the elements 7 move with the belt 4 in the transverse direction relative to the longitudinal axis of the containers 2 during the engagement of the containers 2 so that they freely pass in the space between the wedge-shaped projections 10b. At the horizontal travel path of the belt 4, the bosses 19 are wedged in the projections 10b thereby transmitting traction force thereto. In addition, the forces developed in this joint prevent the containers 2 and the elements 7 from moving in the transverse direction so that wear of the bosses 19 is avoided and pressure on the part of the belt 4 to the supports 11 is reduced.

Where the supports 11 are made in the form of the troughs 20,21, the engagement of the elements 7 with the containers 2 occurs in the same manner as described above, and the belt 4 freely slides over the support surfaces 22, 23 of the troughs 20,21. Water in the wedge-shaped recesses 24 flows, under the action of forces of cohesion with the surface of the belt 4, to the narrow portion 25 of each recess 24 so that an increased pressure develops to lift the belt 4 and to ensure the presence of a permanent water layer between the belt 4 and the support surfaces 22, 23 of the troughs 20,21.

The conditions of liquid lubrication provided as described above ensure sufficiently low coefficient of friction which does not exceed 0.001 and eliminate mechanical wear of the belt 4 and support surfaces 22,23 of the troughs 20,21.

Coefficient of friction is reduced to a larger extent in case air is fed to the passage 27 through the air nozzle 31. In such case air is mixed with water fed to the passage 27 to form an air-water emulsion filling the space between the belt 4 and the support surfaces 22, 23 of the troughs 20, 21. Not only the air bubbles reduce the coefficient of friction, but minimum speed of the belt 4 ensuring the provision of a stable liquid layer between the belt 4 and the support surfaces 22, 23 of the troughs 20,21 is also lowered.

In case the supports 11 are made in the form of individual blocks 32, the belt 4 is only supported by the blocks 32. However, since the belt 4 is connected to the containers 2 through the agency of its elements 7, the containers and the belt having neutral buoyancy, there is almost no slack of the belt 4 between the individual blocks 32.

An experimental prototype of the arrangement for pipeline transportation of cargoes was subjected to a comprehensive testing, and the test results confirmed considerable reduction of power consumption for transportation of cargoes compared to the prior art arrangements of the type. In transporting cargoes at distances of 1000–4000 km using the arrangement according to the invention, the transportation cost was three-four times lower compared to the railway transportation cost.

The arrangement according to the invention is sufficiently reliable and simple in operation and inexpensive in the manufacture.

What is claimed is:

1. An arrangement for pipeline transportation of cargoes comprising: a pipeline filled with liquid at substantially atmospheric pressure; containers accommodated in said pipeline; conveyors arranged in a sequence along the entire length of said pipeline; said conveyors being adapted to displace said containers along said pipeline; endless traction members of said conveyors engaging said containers during their displacement along said pipeline; supports mounted in said pipeline serving as guides for each of said endless traction members of said conveyors during their movement; each of said endless traction members of said conveyors comprising a belt having at least one row of elements equally spaced along the length thereof; each of said containers having at least one longitudinal groove extending substantially the entire length and being recessed within an exterior surface of said container; stops positioned in said at least one longitudinal groove; said endless traction members of said conveyors being adapted to fit into said longitudinal grooves and engage said stops so that movement of said conveyors displaces said containers; a drive for said conveyors; a source of liquid at substantially atmospheric pressure communicating with said pipeline.

2. An arrangement according to claim 1, wherein the adjacent elements in each row of the belt are spaced apart at a distance equal to at least one third of the length of each of said containers.

3. An arrangement according to claim 1, wherein said containers have an arcuate-shaped bottom wall and wherein the belt of each of said conveyors has an arcuate-shaped drive run corresponding with the shape of the bottom wall of each of said containers and has two rows of said elements arranged along the edges of the belt, the elements of both rows being mounted in an inclined position relative to one another, respectively, and each of said containers having two of said longitudinal grooves with said stops engaging the belt elements during the movement of said containers.

4. An arrangement according to claim 1, wherein said stops of said at least one longitudinal groove of each of said containers comprise transverse partition members equally spaced along said at least one longitudinal groove.

5. An arrangement according to claim 1, wherein each element of the belt is provided, at the distal end thereof, with a roller having its axis substantially at right angle to the longitudinal axis of the belt so that the belt is stabilized relative to the containers.

6. An arrangement according to claim 1, wherein said stops of said at least one longitudinal groove of each of said containers comprise wedge-shaped projections arranged in a sequence on the side walls of each of said at least one longitudinal groove along the entire length thereof, and the belt elements are provided, at the distal ends thereof, with wedge-shaped bosses for engaging the wedge-shaped projection of said at least one longitudinal groove.

7. An arrangement according to claim 1, wherein said belt supports comprise troughs having support surfaces facing the belts, said support surfaces having recesses which are wedge-shaped in cross-section with the narrow portion of each recess oriented in the direction of movement of the belt, the large portion of each recess being provided with a passage for admission of liquid for filling said pipeline to the surface of the belt facing the troughs.

8. An arrangement according to claim 4, wherein each transverse partition member of said at least one longitudinal groove includes means for absorbing forces generated during engagement of the distal end of a respective belt element with said partition member.

9. An arrangement according to claim 7, wherein the recesses of each trough are equally spaced in a staggered pattern over the support surface thereof.

10. An arrangement according to claim 7, wherein each passage of the large portion of each recess incorporates a nozzle communicating with a source of air for feeding air to the support surface of the trough so as to form an air-water emulsion to reduce friction during the movement of the belt.

11. An arrangement according to claim 7, wherein each trough is of a length which is 0.2–0.5 of the length of one of said containers, the troughs being spaced from one another at a distance of 2–5 lengths of one of said containers.

12. An arrangement according to claim 8, wherein said means for absorbing forces comprises a spring-biased member connected to said transverse partition member.

* * * * *